*I. S. Dodge,*
*Inserting Pivot Teeth.*

Nº 3,485.     Patented Mar. 13, 1844.

UNITED STATES PATENT OFFICE.

J. S. DODGE, OF NEW YORK, N. Y.

SETTING ARTIFICIAL TEETH.

Specification of Letters Patent No. 3,485, dated March 13, 1844.

*To all whom it may concern:*

Be it known that I, J. SMITH DODGE, of the city, county, and State of New York, have invented a new and Improved Cylinder for Inserting Artificial Teeth to Roots or Stumps of Natural Teeth Remaining in the Mouth; and I do hereby declare that the following is a full and exact description of my invention.

The nature of my invention consists in providing a metallic cylinder or tube to be placed within the cylinder of wood now commonly made use of in cases where a metallic pivot is necessary or desirable in securing artificial teeth to roots or stumps of natural teeth remaining in the mouth thereby enabling the individual wearing such tooth or teeth either separately or connected to remove, clean, and replace it or them at pleasure without the disadvantage of the tooth or teeth soon becoming loose by friction as is the case in the common mode of insertion.

To enable others skilled in the art to make and use my invention I will proceed to describe its construction and advantages.

I construct my cylinder of gold, silver, platina or any other metal or composition of metals that may or can be used for such purpose of any length or size that may be required with a cap or stopping at one end to prevent moisture from entering the cavity of the root causing internal decay or without the cap or stopping as may be required leaving a free opening through its entire length.

The advantages of my invention are these, viz, it enables the persons wearing artificial teeth thus inserted to remove, clean and replace them at pleasure, (without a liability to become loose by friction) thereby preserving the roots for a much longer period than they ordinarily last, also avoiding most of the liability to swelling of the face which often unavoidably occurs in the common mode of insertion and preserves the mouth in a clean and healthy condition.

Figure 2:
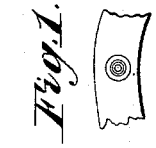
Figure 1:

In the accompanying drawing Figure 1, represents a top view of a part of the gum, having a natural root or stump within it, which is designated by the outer or white circle; the next circle is supposed to be a plug of wood, such as is ordinarily inserted within such roots or stumps, to receive a pin, attached to an artificial tooth as shown at *a*, Fig. 2. The yellow circle within this, shows a tube of gold, or other suitable metal, the cavity in the center of which is of such size as just to admit the pin *a*, Fig. 2.

Having thus fully described the nature of my invention, and shown the manner in which I carry the same into operation, what I claim therein as new, and desire to secure by Letters Patent is—

The mode herein described of inserting artificial teeth, that is to say, by inclosing a metallic tube within the wooden plug or cylinder commonly employed in fixing artificial teeth, the wood and metal being both inserted in the stump or root substantially in the manner described the said metallic cylinder constituting the socket for the pivot.

J. SMITH DODGE.

Witnesses:
RICH. K. WATTS,
CHARLES E. KELLS.